W. A. CRAWFORD-FROST.
TROLLEY DEVICE FOR ELECTRIC CARS.
APPLICATION FILED OCT. 13, 1908.
918,287.
Patented Apr. 13, 1909.
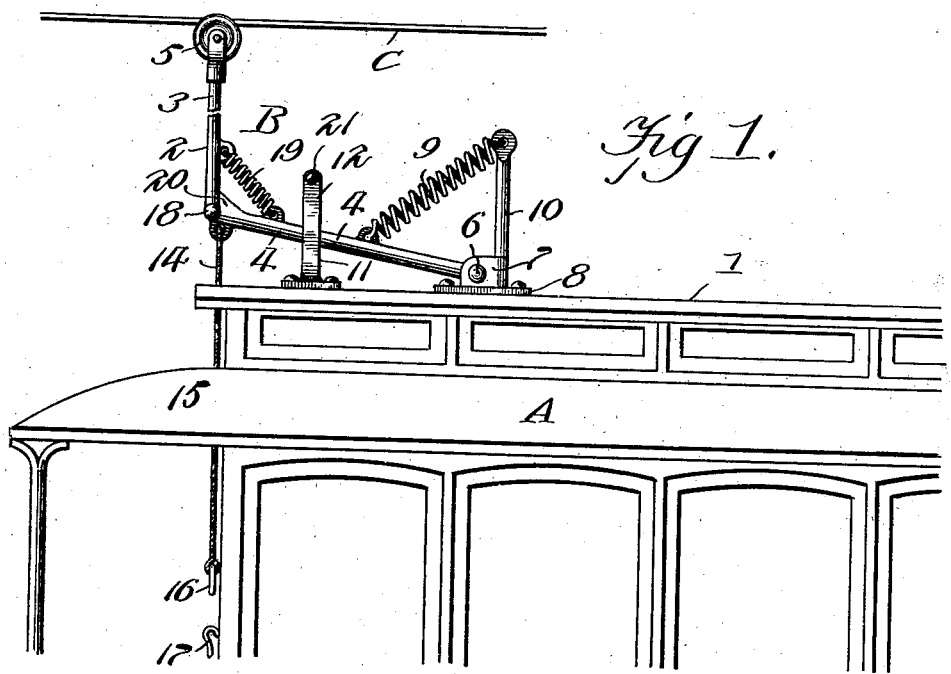
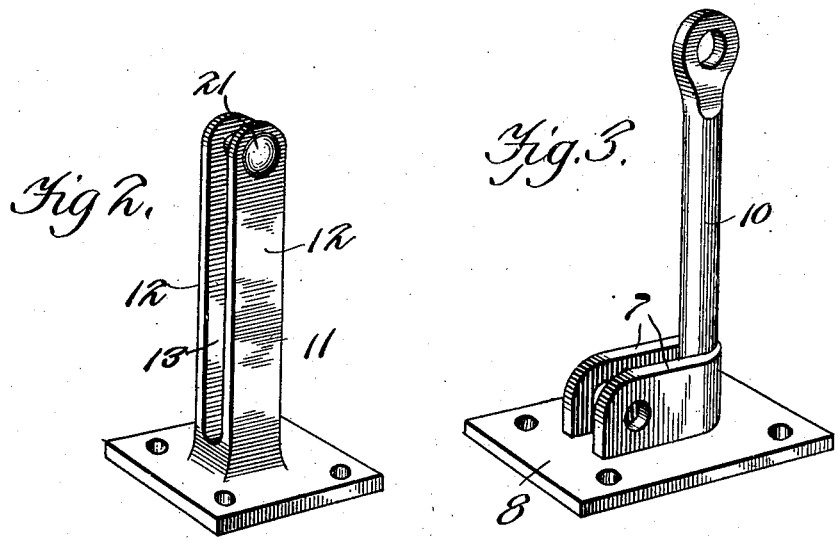
Witnesses
Hugh H. Ott
C. Bradway
Inventor
William A. Crawford-Frost
By Victor J. Evans
Attorney

UNITED STATES PATENT OFFICE.

WILLIAM A. CRAWFORD-FROST, OF BALTIMORE, MARYLAND.

TROLLEY DEVICE FOR ELECTRIC CARS.

No. 918,287.   Specification of Letters Patent.   Patented April 13, 1909.

Application filed October 13, 1908.   Serial No. 457,510.

*To all whom it may concern:*

Be it known that I, WILLIAM A. CRAWFORD-FROST, a citizen of the United States, residing at Baltimore city, State of Maryland, have invented new and useful Improvements in Trolley Devices for Electric Cars, of which the following is a specification.

This invention relates to trolley wheel supports for electric cars and relates more particularly to means whereby the trolley wheel is effectively maintained in contact with the overhead conductor or trolley wire so that the loss of time, inconvenience and trouble due to the jumping of the trolley will be overcome.

The invention has for one of its objects to improve and simplify the construction and operation of devices of this character so as to be comparatively simple and inexpensive to manufacture and install, reliable and efficient in use, and composed of comparatively few parts.

Another object of the invention is the provision of a trolley pole in the form of an elbow pivotally mounted on the top of the car and urged upwardly by a spring or other motor to press the trolley wheel into under-engagement with the trolley wire, in combination with a vertically-disposed guide on the car roof which engages the pole in such a manner as to permit the latter to rise and fall without allowing lateral movement so that the trolley wheel will be effectively engaged with the overhead wire.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a side view of a portion of an electric car provided with the improved trolley support. Fig. 2 is a perspective view of the guide for the trolley pole. Fig. 3 is a perspective view of the bearing on which the trolley pole is mounted.

Similar reference characters are employed to designate corresponding parts throughout the views.

Referring to the drawing, A designates an ordinary electrically-propelled street car which is equipped with the trolley device designated generally by B mounted on the roof 1 of the car in coöperative relation with the overhead conductor or trolley wire C.

The trolley device B comprises a pole 2 in the form of an elbow or L-shaped structure having approximately vertical and horizontal arms 3 and 4, there being a trolley wheel or collector 5 on the upper extremity of the arm 3 for contact with the wire C. The extremity of the arm 4 is mounted on a horizontal pivot 6 extending through apertured lugs 7 on a bearing plate 8 that is secured to the roof of the car. The trolley pole may be urged upwardly by any suitable means, such for instance, as a spring 9 connected with the arm 4 and with the upper extremity of an upright post 10 secured to the bearing plate 8 for the purpose of maintaining the trolley wheel in under-running contact with the trolley wire.

Arranged on the car roof 1 is a guide 11 provided with spaced members or fingers 12 which form a vertical guideway 13 in which the arm 4 of the trolley pole is disposed. This guide permits the trolley wheel to rise and fall with the variations in height of the trolley wire but prevents the trolley pole from swaying from side to side so that the trolley wheel will be maintained directly under the trolley wire, thereby assisting materially in retaining the wheel on the wire.

At the elbow or corner of the trolley pole is attached a rod, cord or the like 14 that passes downwardly through the hood 15 over the platform of a car, and on the lower end of the element 14 is a ring 16 that is adapted to be engaged with a hook or other fastening 17 on the body of the car to hold the trolley pole in lowered position. By this means, the conductor can readily control the trolley pole without leaving the platform.

In order to permit the trolley wheel to lower, as in going under bridges where the trolley wire is comparatively low, the arms 2 and 3 of the trolley pole are hingedly connected at 18 and the arm 3 is held in normal position by an extension spring 19 connected at its ends with the arms 3 and 4 adjacent the hinged ends thereof and this spring holds the arm 3 yieldingly against an abutment 20 extending upwardly from the arm 4 at the hinge 18. The pole is prevented from rising too high in case the trolley wheel leaves the wire by a stop 21 provided at the top of the guide 11 against which the lower trolley member 4 strikes when the pole is drawn upwardly by the spring 9.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim is:—

1. The combination of a car with a trolley device on the car comprising a swinging pole composed of hingedly-connected parts, an elastic element connected with the parts of the pole for holding one of the parts yieldingly in operative position with respect to the other, means for urging the pole upwardly, a collector on the pole arranged to engage the wire, and a guide on the car for engaging the pole at a point remote from its fulcrum for permitting the pole to rise and fall in a vertical plane and preventing lateral movement with respect to the car.

2. In a device of the class described, the combination of a trolley pole having approximately vertical and horizontal arms, a collector on the extremity of the vertical arm, a fulcrum for attaching the horizontal arm to a car, a motor for urging the pole upwardly, and a guide adapted to be secured to the car to engage the horizontal arm of the pole for limiting the movement of the pole to a vertical plane.

3. In a device of the class described, the combination of a trolley pole having angularly disposed arms, a collector on one arm, a bearing plate adapted to be secured to the roof of a car, a pivot connecting the second arm with the plate, a post rising from the plate, a spring connected with the post and second arm for urging the pole upwardly, and a guide adapted to be secured to the roof of the car to engage the second arm for limiting the movement of the pole to a vertical plane.

4. An electric car including a roof and a head, with a trolley device mounted on the roof, said device comprising a pole consisting of an L-shaped structure, means for pivotally mounting the pole on the roof, a motor for urging the pole upwardly, a guide on the roof for the pole for preventing the lateral movement of the latter, a controlling element connected with the pole adjacent the corner thereof and extending downwardly through the head, and a fastening on the car for securing the element thereto for holding the pole in lowered position.

5. The combination of a trolley pole consisting of hingedly connected arms, means for connecting one of the arms to a moving vehicle, a spring acting on such arm for holding the trolley pole in raised position, a collector carried by the other arm, and a spring connected with both arms for yieldingly maintaining the collector-carrying arm in raised position.

6. The combination of a trolley pole consisting of hingedly connected arms, means for connecting one of the arms to a moving vehicle, a spring acting on such arm for holding the trolley pole in raised position, a collector carried by the other arm, a spring connected with both arms for yieldingly maintaining the collector-carrying arm in raised position, and a guide in which the trolley pole moves in a vertical plane.

In testimony whereof I affix my signature in presence of two witnesses.

WILLIAM A. CRAWFORD-FROST.

Witnesses:
 FRANK DRISCOLL,
 SOLOMON LAUER, Sr.